US012592139B2

(12) United States Patent
Ardeneaux et al.

(10) Patent No.: US 12,592,139 B2
(45) Date of Patent: Mar. 31, 2026

(54) CATWALK SENSING DEVICE

(71) Applicant: Frank's International, LLC, Houston, TX (US)

(72) Inventors: Justin Ardeneaux, Houston, TX (US); Matthew Weber, Duson, LA (US); Keith Lutgring, Lafayette, LA (US); Tanner Boudreaux, Houston, TX (US); Robert L. Thibodeaux, Lafayette, LA (US); Benjamin Latour, Houston, TX (US); Jeremy R. Angelle, Youngsville, LA (US)

(73) Assignee: FRANK'S INTERNATIONAL, LLC, Houston, TX (US)

( * ) Notice: Subject to any disclaimer, the term of this patent is extended or adjusted under 35 U.S.C. 154(b) by 322 days.

(21) Appl. No.: 18/453,048

(22) Filed: Aug. 21, 2023

(65) Prior Publication Data

US 2024/0062639 A1 Feb. 22, 2024

Related U.S. Application Data

(60) Provisional application No. 63/373,116, filed on Aug. 22, 2022.

(51) Int. Cl.
*E21B 19/15* (2006.01)
*G08B 21/02* (2006.01)

(52) U.S. Cl.
CPC ............ *G08B 21/02* (2013.01); *E21B 19/155* (2013.01)

(58) Field of Classification Search
CPC ........ E21B 19/14; E21B 19/15; E21B 19/155; E21B 19/00; E21B 17/006; E21B 19/165;
(Continued)

(56) References Cited

U.S. PATENT DOCUMENTS 9,394,751 B2 * 7/2016 Magnuson ............ E21B 17/006
11,624,248 B2 * 4/2023 Owoeye .................. E21B 19/10 166/250.01

(Continued)

FOREIGN PATENT DOCUMENTS

GB 2482853 A 2/2012
WO WO-2017132297 A2 * 8/2017 ............ G01B 11/02
WO 2022072429 A2 4/2022

OTHER PUBLICATIONS

Extended European Search Report dated Nov. 24, 2023, EP Application No. 23192707.0, 7 pages.

(Continued)

*Primary Examiner* — Andre J Allen
(74) *Attorney, Agent, or Firm* — MH2 Technology Law Group, LLP

(57) ABSTRACT

A portable catwalk sensing device includes a proximity detector configured to detect a proximity of a conveyor portion of a catwalk tubular transport machine, a tubular carried by the catwalk tubular transport machine, or both, to a predetermined location relative to the rig floor. The device also includes a module having a processor, and configured to communicate with the proximity detector and receive data representing proximity of the catwalk tubular transport machine, the tubular, or both from the proximity detector, a rig floor, or a combination thereof. The module includes a housing and is configured to be portable. The device also includes an alarm coupled to or integral with the module. The alarm is configured to communicate with the processor, such that the processor is configured to cause the alarm to provide an indication to a user of the proximity of the catwalk tubular transport machine, the tubular, or both.

17 Claims, 3 Drawing Sheets

(58) Field of Classification Search
CPC .......... E21B 15/00; E21B 19/02; E21B 19/16; E21B 15/003; E21B 15/02; E21B 3/045; E21B 47/00; E21B 19/20; E21B 19/08; E21B 19/10; E21B 21/08
See application file for complete search history.

(56) References Cited

U.S. PATENT DOCUMENTS

| | | | |
|---|---|---|---|
| 2005/0104764 A1 | 5/2005 | Young | |
| 2016/0017674 A1 | 1/2016 | Richardson et al. | |
| 2016/0305201 A1* | 10/2016 | Bowley | E21B 19/14 |
| 2018/0347752 A1 | 12/2018 | Costello et al. | |
| 2019/0186216 A1 | 6/2019 | Magnuson et al. | |
| 2020/0110005 A1 | 4/2020 | Williams et al. | |
| 2020/0141197 A1* | 5/2020 | Morelli | E21B 19/087 |
| 2021/0131198 A1* | 5/2021 | Magnuson | E21B 19/165 |
| 2022/0018197 A1 | 1/2022 | Hansen et al. | |

OTHER PUBLICATIONS

EP Communication Pursuant to Article 94(3) dated Dec. 18, 2025, EP Application No. 23192707.0, 6 pages.

* cited by examiner

CATWALK SENSING DEVICE

This application claims priority to U.S. Provisional Patent Application No. 63/373,116, filed on Aug. 22, 2022, the entirety of which is incorporated by reference.

BACKGROUND

In oil and gas drilling operations, tubulars are assembled into strings and used for drilling and completing the wellbore. During drilling operations, the tubulars are segments of drill pipe, and at the lower end of the string, segments of drill collars. In many drilling rigs, the tubulars are stored in horizontal storage racks, adjacent to the drilling rig floor and/or derrick (part of the rig structure). Individual segments are transported in this horizontal orientation to the rig floor, generally by a catwalk type tubular transport system ("catwalk machine"), which often includes a lateral conveyor system.

Once transported to the rig floor, the tubular may be hoisted into a vertical orientation above the rig floor by a pipe hoisting system that latches onto the leading end of the tubular. The tubular, now in a vertical orientation, may then be made up to another tubular, e.g., the upper end of the drill string that has already been run into the wellbore, or a partial stand of tubulars, if stand-building operations are being supported.

Casing tubulars are run into the well after a portion of the well has been drilled and the drill string removed and may be cemented in place therein. Such casing is generally stored, transported, hoisted, and made-up, in a process similar to that just described for drill strings, and again making use of a catwalk machine.

Efficient rig operation often calls for multiple simultaneous activities to take place, e.g., drilling the wellbore while positioning the next add-on tubular. As the tubulars approach and enter the rig floor area, personnel may be present on or near the rig floor and engaged in another of the simultaneous activities. The tasks these personnel are performing may call for their full attention but may not be directly related to the movement of the tubular by the catwalk machine. Accordingly, there is a safety risk, as these personnel may not be aware of the moving tubular and could be struck and injured by the tubular.

To mitigate such safety risks, catwalk machines may incorporate sensors for detecting when the end of a tubular section is moving into the area of the rig floor and provide various types of warnings (audible, visual via flashing lights, vibrating, etc.) to personnel working on the rig floor. However, at times the catwalk machine's sensing/warning system may not be properly maintained or may otherwise be in need of repair, and thus may be ineffective and unable to provide the level of safe rig operation that is desired. Furthermore, in many instances the parts and/or expertise to repair the catwalk machine's safety system may not be immediately available at the rig site. To avoid non-productive time, rig floor activity is often carried out with wholly or partially inoperative catwalk sensing devices and/or warning devices in place, leading to a diminished level of safety.

SUMMARY

Embodiments of the disclosure include a portable catwalk sensing device including a proximity detector configured to detect a proximity of a conveyor portion of a catwalk tubular transport machine, a tubular carried by the catwalk tubular transport machine, or both, to a predetermined location relative to the rig floor. The proximity detector is configured to be releasably mounted to a rig structure or the conveyor portion. The device also includes a module including a processor, the module being configured to communicate with the proximity detector and receive data representing proximity of the catwalk tubular transport machine, the tubular, or both from the proximity detector, a rig floor, or a combination thereof, the module also including a housing and being configured to be portable. The device includes an alarm coupled to or integral with the module. The alarm is configured to communicate with the processor, such that the processor is configured to cause the alarm to provide an indication to a user of the proximity of the catwalk tubular transport machine, the tubular, or both.

Embodiments of the disclosure include a method including determining that a primary catwalk sensing device of a rig structure is at least partially non-operative, deploying a portable catwalk sensing device to the rig structure, the portable catwalk sensing device including a proximity detector, a module including a processor, and an alarm, mounting the proximity detector to the rig structure or a catwalk machine conveyor, such that the proximity detector is configured to detect a proximity of a catwalk machine, a tubular being carried by the catwalk machine, or both, the proximity detector being in communication with the module, monitoring the proximity detector using the module, and transporting a tubular to the rig structure using the catwalk machine. The processor receives a signal from the proximity detector representing the proximity of the catwalk machine, the tubular, or both to the proximity detector, and the processor causes the alarm to generate an indication in response to the signal.

The foregoing summary is intended merely to introduce a subset of the features more fully described of the following detailed description. Accordingly, this summary should not be considered limiting.

BRIEF DESCRIPTION OF THE DRAWINGS

The accompanying drawing, which is incorporated in and constitutes a part of this specification, illustrates an embodiment of the present teachings and together with the description, serves to explain the principles of the present teachings. In the figures.

Figure 1:
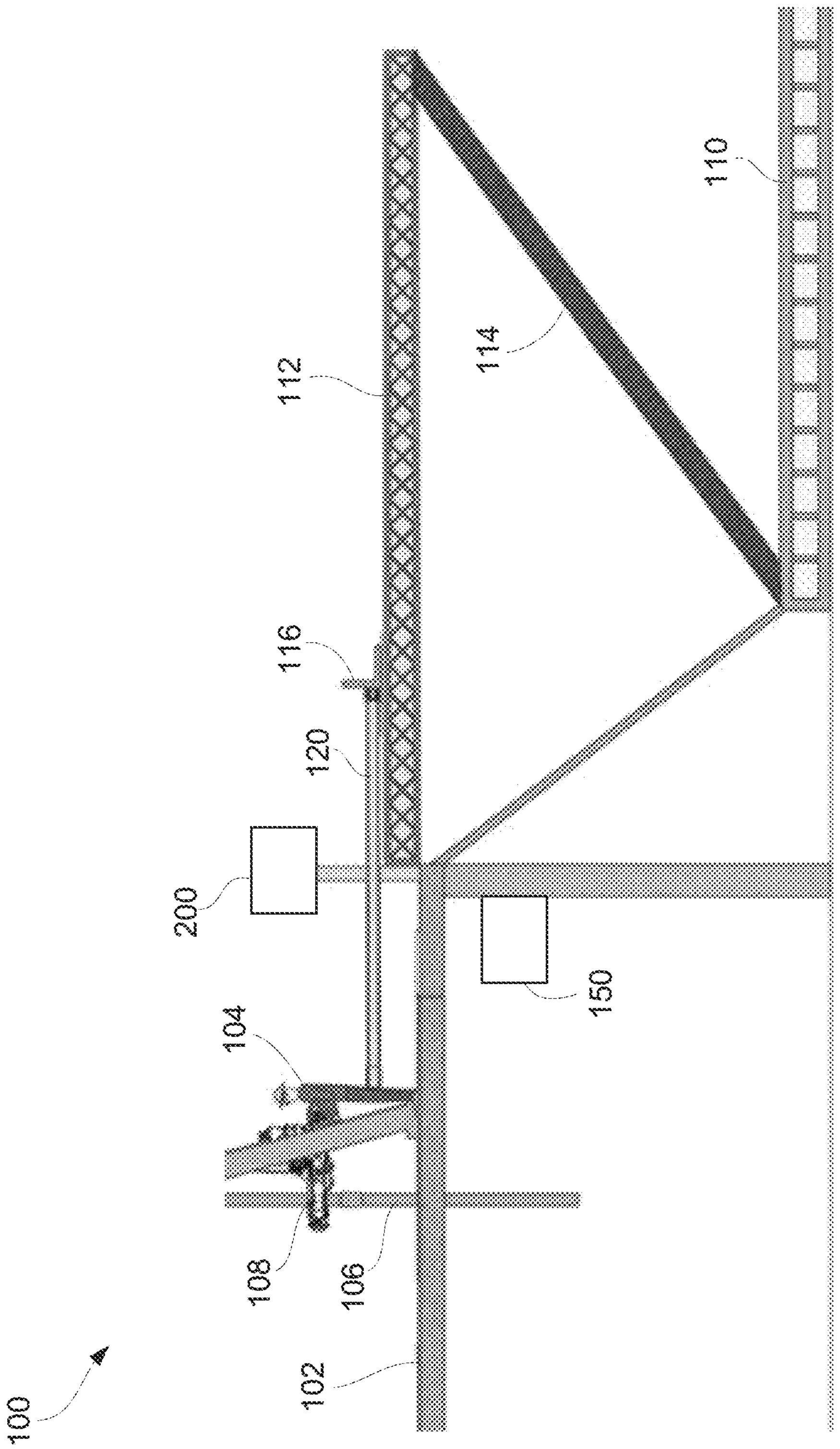
FIG. 1 illustrates a schematic side view of a rig structure with a catwalk machine and a tubular carried thereon, according to an embodiment.

It should be noted that some details of the figure have been simplified and are drawn to facilitate understanding of the embodiments rather than to maintain strict structural accuracy, detail, and scale.

DETAILED DESCRIPTION

Reference will now be made in detail to embodiments of the present teachings, examples of which are illustrated in the accompanying drawing. In the drawings, like reference numerals have been used throughout to designate identical elements, where convenient. The following description is merely a representative example of such teachings.

FIG. 1 illustrates a side view of a rig structure 100 (e.g., a drilling rig), according to an embodiment. As shown, the rig structure 100 may include a rig floor 102, upon which rig personnel 104 may be located. A tubular string 106 may be deployed through the rig floor 102. Hoisting equipment (not shown) such as an elevator may be used to align add-on tubulars with the tubular string 106, for connecting the add-on tubulars to the tubular string 106, to extend the tubular string 106 and permit advancement of the tubular string 106 into the well below. Such hoisting equipment may include elevators or top drive mounted casing running tools. Other rig equipment may also be used, e.g., tongs 108, top drives, etc., as is known in the art to rotationally makeup the add-on tubular to the string suspended in the wellbore.

The rig structure 100 may also include a catwalk machine 109, which may include a base 110, a conveyor 112, and a raising assembly 114. The raising assembly 114 may be configured to lift the conveyor 112 away from the base 110, which may be located at the ground, up to a horizontal or near horizontal orientation at an elevation of the rig floor 102. The conveyor 112 may include a carriage 116 that is configured to move along the length of the conveyor 112.

In operation, a tubular 120 may be positioned, in a horizontal or near horizontal orientation, onto the conveyor 112 when the raising assembly 114 is in a lowered or collapsed configuration. The conveyor 112 may be raised vertically by the raising assembly 114, along with the tubular 120. The conveyor 112 may then move the tubular 120 along the conveyor by moving the carriage 116, such that the tubular 120 is moved toward the rig floor 102 in its horizontal or near horizontal orientation. The hoisting equipment may then engage and lift, the tubular 120 into a vertical orientation. Other equipment such as a power tong 108 may then make the tubular 120 up to the tubular string 106 and thereby making it possible to advance the tubular string 106 into the well below.

As shown, there exists the potential for the tubular 120, moved on the conveyor 112, to contact and injure the rig personnel 104. Accordingly, a portable catwalk sensing device 200 may be provided. In at least some embodiments, the portable catwalk sensing device 200 may be a secondary, back-up, or substitute system for a primary catwalk sensing device 150 that is integrated into the control system of the rig structure 100. The catwalk sensing device 200 may be modular and portable, and may be configured to be easily connected to and disconnected from the rig structure 100. Further, the portable catwalk sensing device 200 may be readily accessible to the rig personnel 104 on the rig floor 102, e.g., to facilitate installation and removal. The primary catwalk sensing device 150 may not be readily accessible on the rig floor 102.

Figure 2:
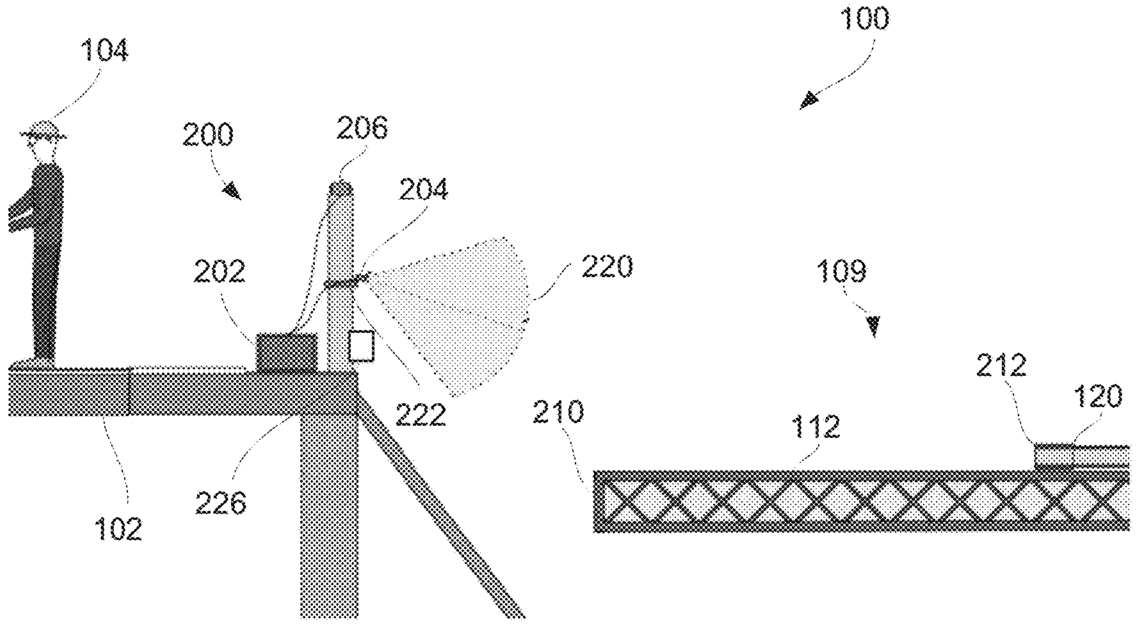
FIG. 2 illustrates a schematic side view of a portion of the rig structure, with a catwalk machine thereof being moved toward a rig floor of the rig structure, according to an embodiment.

FIG. 2 illustrates a more detailed, but still schematic view of a portion of the rig structure 100, according to an embodiment. In this view, the conveyor 112 of the catwalk machine 109 is separated from the rig floor 102, e.g., vertically and horizontally, and is being raised toward the rig floor 102, e.g., via the raising assembly 114 (FIG. 1).

The portable catwalk sensing device 200, as shown schematically, may include a module 202, a proximity detector, such as a sensor 204, and an alarm 206. In at least one embodiment, the module 202, sensor 204, and alarm 206 may be movable, e.g., as a single unit, on and off the rig floor 102 by the rig personnel 104. Further, the installation of the portable catwalk sensing device 200 may not require removal or disabling the primary catwalk sensing device 150 (e.g., FIG. 1), but may be used as a redundancy measure or in lieu of the primary catwalk sensing device 150, in case the primary catwalk sensing device 150 is partially or entirely inoperative.

The sensor 204 may be configured to detect a proximity of the catwalk machine 109, e.g., specifically, a proximal end 210 of the conveyor 112 and/or a proximal end 212 of the tubular 120. For example, the sensor 204 may be an optical, acoustic (e.g., Doppler), electromagnetic, infrared, or any other type of sensor, and may have a range (schematically depicted and labeled as 220). The sensor 204 may thus be configured to determine when, and in some instances, a distance, velocity, or any other measurement, of the conveyor 112, tubular 120, or both from the sensor 204. Further, the sensor 204 may be mounted at a specific location on the rig structure 100, e.g., on a rail or beam, e.g., using a clamp 222 or another fastener (e.g., U-bolt, bracket, etc.). Alternatively, sensors or targets worn by personnel working on the rig floor may be coupled with a sensor mounted to the conveyor 112 such that the sensor is able to detect when the path of movement of the tubular 120 and/or the conveyor 112 intersected the location of personnel on the rig floor.

Additionally or instead of a non-contact sensor 204, the proximity detector may be or include one or more mechanical switches 226. The mechanical switch 226 may be affixed to the rig structure 100 or the catwalk machine conveyor 112 to detect proximity of the conveyor 112 to the rig floor 102. For example, physical engagement of the conveyor 112 may depress a button or move a lever, or cause another mechanical movement, which may be registered by the mechanical switch 226 as a signal to the module 202.

The module 202 may include a processor, memory, one or more computer-readable media, and/or other computer components. Further, the module 202 may be in communication with the sensor 204, so as to receive signals therefrom, with the signals including data representing the proximity (e.g., binary detected/not detected, or a value for the distance) of the conveyor 112 and/or tubular 120 relative to the sensor 204. The module 202 may store the positioning of the sensor 204 relative to the rig floor 102 and/or relative to the conveyor 112 and/or tubular 120 when the tubular 120 is in position to be moved onto the rig floor 102. Accordingly, the module 202 may interpret and store the positional signal based at least in part on settings established prior to use, and compare the measured proximity, distance, velocity, etc., of the conveyor 112 and/or the tubular 120 relative to the rig floor 102 against preselected criteria stored in the module 202.

The alarm 206 may be in communication with the module 202. The alarm 206 may be configured to produce an indication, such as a visible, audible, vibratory, or another type of indication in response to signals from module 202. In some embodiments, the alarm 206 may be mounted to the rig structure 100, as shown, but in others, may be worn by the rig personnel 104. Further, the alarm 206 may communicate with the module 202 via a wired connection, or a wireless connection. Multiple alarms 206 may be employed, with the same or different types of indications being generated thereby.

The module 202 may be configured to send a signal to the alarm 206, and thereby cause the alarm 206 to provide the indication. In at least one example, the module 202 may cause the alarm 206 to provide the indication in response to the module 202 determining that the sensor 202 has detected the conveyor 112 and/or tubular 120 within a predetermined distance, e.g., within the range 220 of the sensor 204. In at least some embodiments, the alarm 206 may be capable of two or more indications (e.g., different loudness, different combinations of visible, audible, and/or vibratory, etc.). The module 202 may cause the alarm 206 to provide a first such indication in response to the sensor 204 first detecting the conveyor 112 and/or tubular 120 and a second indication in response to the sensor 204 detecting that the conveyor 112, and/or the tubular 120, has come into closer proximity to the rig floor 102 (e.g., based on the sensor 204 measuring a proximity that is smaller than a threshold distance). Further, the module 202 may cause the alarm 206 to generate one or more indications based on a velocity of the conveyor 112 and/or tubular 120, e.g., providing information that the conveyor 112 and/or tubular 120 is within the range 220 and moving toward the rig floor 102 so as to alert any nearby rig personnel 104.

In at least some embodiments, the portable catwalk sensing device 200 may include components that, individually and collectively (including connections therebetween), that may meet industry requirements for use in hazardous locations. Further, the components and/or connections therebetween may meet industry requirements for intrinsically safe electrical systems or explosion proof electrical devices/systems.

Figure 3:
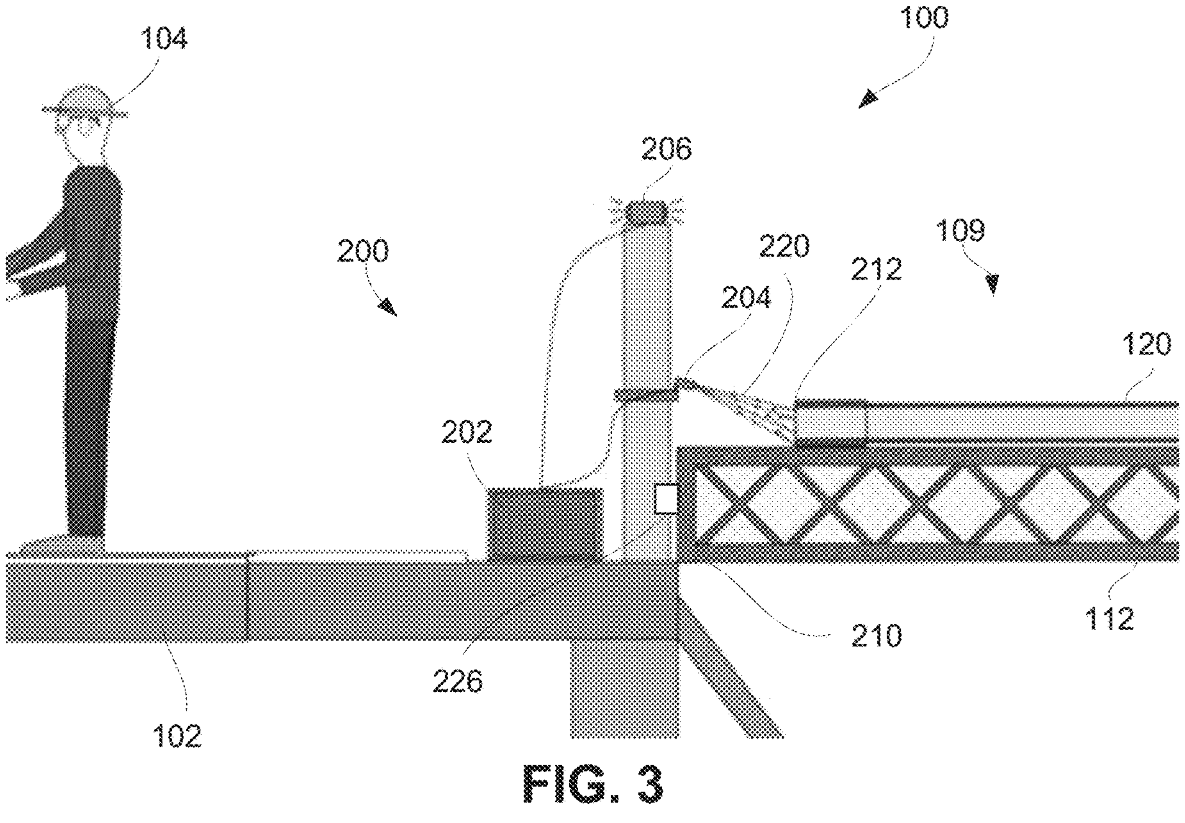
FIG. 3 illustrates a schematic side view of a portion of the rig structure, with the catwalk machine and/or a tubular carried thereon, being sensed by a sensor, according to an embodiment.
Figure 4:
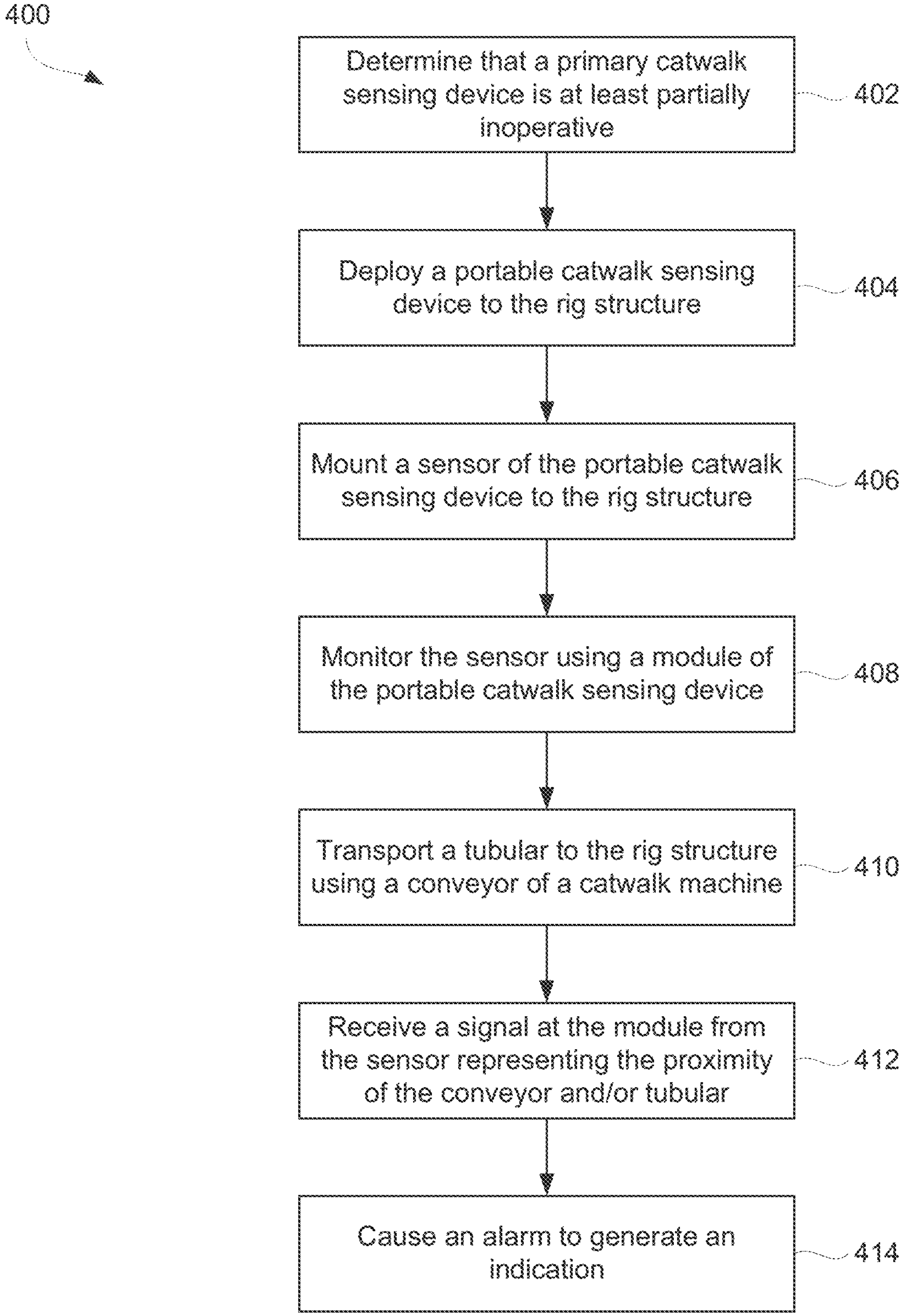
FIG. 4 illustrates a flowchart of a method, according to an embodiment.

FIG. 3 illustrates a schematic view of a portion of the rig structure 100, according to an embodiment. The view of FIG. 3 is similar to that of FIG. 2, except the conveyor 112 and the tubular 120 are now in closer proximity to the rig floor 102. Accordingly, as shown, the proximal end 212 of the tubular 120 is within the range 220 of the sensor 204. The sensor 204 is thus sending signals to the module 202 with data representing the proximity (e.g., a binary signal simply indicating that the end 212 is in proximity to the sensor 204 and/or a distance measurement). In turn, the module 202 interprets these signals and causes the alarm 206 to provide the indication (a visible light in this illustration), alerting the nearby rig personnel 104 of the proximity and/or movement of the tubular 120 toward the rig floor 102.

Embodiments of the catwalk sensing device 200 may be employed as part of a method, according to an embodiment. With reference to FIGS. 1-3, FIG. 4 illustrates a flowchart of a method 400, according to an embodiment. It will be appreciated that the method 400 may be executed with structures and devices that differ from the catwalk sensing device 200 embodiments discussed above, and thus the method 400 should not be considered limited to any particular structure, unless otherwise stated herein. Moreover, although the method 400 is presented in a particular sequence of steps, the individual steps may be performed in any other order, combined, separated into two or more discrete steps, etc. without departing from the present disclosure.

The method 400 may include determining that a primary catwalk sensing device 150 of a rig structure 100 is not at least partially inoperative, as at 402. An example of this state may be the primary catwalk sensing device 150 being entirely inoperative, malfunctioning, not reading distance within a specific tolerance, or otherwise not providing a level of safety, as determined by rig personnel 104 or others having ordinary skill in the art.

The method 400 may also include deploying a portable catwalk sensing device 200 to the rig structure 100, as at 404. The portable catwalk sensing device 200 may be deployed/installed without requiring removal of the primary catwalk sensing device 150, which may be integrated into the control system of the rig structure 100. The portable catwalk sensing device 200 may be standalone, e.g., not integrated into the control system of the rig structure 100. Moreover, the portable catwalk sensing device 200 may be "modular", meaning it is made up of two or more modules, and may be extended, in at least some embodiments, to include additional modules. In an embodiment, the portable catwalk sensing device 200 includes a sensor 204, a module 202 that includes a processor, memory system, electrical circuitry, etc., and an alarm 206. The sensor 204 may communicate signals including data to the module 202, and the module 202 may communicate signals to the alarm 206. The portable catwalk sensing device 200 may be deployed as a single unit to the rig floor 102, although some assembly (e.g., plugging in of cables, initiation of wireless connectivity, calibration, etc.) may be called for as part of this deployment as a single unit.

The method 400 may also include mounting the sensor 204 to the rig structure 100, such that the sensor 204 is configured to detect a proximity of the catwalk machine 109 (e.g., the conveyor 112), a tubular 120 being carried by the conveyor 112, or both, as at 406. For example, the sensor 204 may be clamped or otherwise fastened to a beam, rail, gate, or other convenient structure of the rig structure 100, which permits the sensor 204 to be directed toward the conveyor 112 and/or the tubular 120 as the conveyor 112 and/or the tubular 120 moves toward the rig floor 102.

The method 400 further includes monitoring the sensor 204 using the module 202, as at 408. The sensor 204 may provide a stream of signals to the module 202, e.g., at predetermined intervals (e.g., at a set frequency). In other embodiments, the sensor 204 may transmit only when it detects the proximity a structure, such as the conveyor 112 and/or tubular 120.

The method 400 may then include transporting a tubular 120 to the rig structure 100 using the conveyor 112, as at 410. For example, the tubular 120 may be in a horizontal orientation, and may be loaded onto the conveyor 112 at or near the ground, below the elevation of the rig floor 102. The conveyor 112 may then be raised, e.g., moved vertically and horizontally, toward the rig floor 102. Once reaching the rig floor 102, the conveyor 112 may convey the tubular 120 onto the rig floor 102 for engagement with tubular hoisting equipment (not shown).

The method 400 may include the module 202 receiving a signal from the sensor representing the proximity of the conveyor 112, the tubular 120, or both to the sensor, as at 412. In response, the module 202 may cause the alarm 206 to generate the indication in response to the signal, as at 414.

In at least some embodiments, the signal from the sensor 204 that is received by the module 202 (e.g., as part of the monitoring process) includes data representing a distance value for the proximity of the tubular 120 and/or conveyor 112 to the rig floor 102 and/or to the sensor 204 itself. Accordingly, the module 202 may determine that the distance value is equal to or less than a threshold, and, in response to determining that the distance value is equal to or less than the threshold, cause the alarm 206 to generate a first alarm as the indication. In at least some embodiments, the module 202 may also determine that the distance value has decreased from the threshold and, in response, cause the alarm 206 to generate a second alarm that is different from the first alarm as the indication (e.g., a two part alarm: the first alarm indicating a first level of proximity and a second alarm indicating a second level of proximity). In at least some embodiments, the module 202 may also, e.g., along with determining the distance value for proximity, determine that a velocity of the conveyor 112, the tubular 120, or both exceeds a threshold, and cause the alarm 206 to generate the indication based on a combination of the velocity and the proximity.

As used herein, the terms "inner" and "outer"; "up" and "down"; "upper" and "lower"; "upward" and "downward"; "above" and "below"; "inward" and "outward"; "uphole" and "downhole"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

While the present teachings have been illustrated with respect to one or more implementations, alterations and/or modifications may be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A portable catwalk sensing device, comprising:

a proximity detector configured to detect a proximity of a conveyor portion of a catwalk tubular transport machine, a tubular carried by the catwalk tubular transport machine, or both, to a predetermined location relative to the rig floor, wherein the proximity detector is configured to be releasably mounted to a rig structure or the conveyor portion;

a module comprising a processor, the module being configured to communicate with the proximity detector and receive data representing proximity of the catwalk tubular transport machine, the tubular, or both from the proximity detector, a rig floor, or a combination thereof, wherein the module comprises a housing and is configured to be portable; and an alarm coupled to or integral with the module, wherein the alarm is configured to communicate with the processor, such that the processor is configured to cause the alarm to provide an indication to a user of the proximity of the catwalk tubular transport machine, the tubular, or both.

2. The catwalk sensing device of claim 1, wherein the indication provided by the alarm is a visual indication, an audible indication, a vibratory indication, or a combination thereof.

3. The catwalk sensing device of claim 1, wherein the proximity detector is configured to be clamped or fastened to the rig structure.

4. The catwalk sensing device of claim 1, wherein the proximity detector is configured to be clamped or fastened to the catwalk tubular transport machine.

5. The catwalk sensing device of claim 1, wherein the proximity detector comprises a sensor that is configured to determine a value representing a distance of the sensor from the catwalk tubular transport machine, the tubular, or both, or from the rig floor to the catwalk tubular transport machine, the tubular, or both, and wherein the processor is configured to control the alarm based at least in part on the distance.

6. The catwalk sensing device of claim 5, wherein the processor is configured to cause a first alarm in response to the distance being less than or equal to a predetermined threshold, and to cause a second alarm in response to the distance decreasing after reaching the predetermined threshold.

7. The catwalk sensing device of claim 1, wherein the proximity detector, the processor, or both are configured to determine a velocity of the catwalk tubular transport machine, and wherein the processor is configured to cause the alarm to provide the indication based at least in part on the velocity.

8. The catwalk sensing device of claim 1, wherein the proximity detector, the module, and the alarm are configured to be installed as a single unit in a rig system, without removing a primary catwalk sensing device of the rig system.

9. The catwalk sensing device of claim 1, wherein the proximity detector is selected from the group consisting of: an optical sensor, an acoustic sensor, an infrared sensor, a magnetic sensor, and a mechanical switch.

10. A method, comprising:

determining that a primary catwalk sensing device of a rig structure is at least partially non-operative;

deploying a portable catwalk sensing device to the rig structure, wherein the portable catwalk sensing device includes a proximity detector, a module including a processor, and an alarm;

mounting the proximity detector to the rig structure or a catwalk machine conveyor, such that the proximity detector is configured to detect a proximity of a catwalk machine, a tubular being carried by the catwalk machine, or both, wherein the proximity detector is in communication with the module;

monitoring the proximity detector using the module; and transporting a tubular to the rig structure using the catwalk machine, wherein the processor receives a signal from the proximity detector representing the proximity of the catwalk machine, the tubular, or both to the proximity detector, and wherein the processor causes the alarm to generate an indication in response to the signal.

11. The method of claim 10, wherein determining that the primary catwalk sensing device is at least partially non-operative comprises determining that the primary catwalk sensing device is inoperative, malfunctioning, or not accurately measuring proximity.

12. The method of claim 10, wherein the portable catwalk sensing device is deployed to the rig structure as a single unit, without removing the primary catwalk sensing device.

13. The method of claim 10, wherein mounting the sensor to the rig structure comprises clamping or fastening the sensor to the rig structure or catwalk machine conveyor, such that the proximity detector is removable from the rig structure.

14. The method of claim 10, wherein the proximity detector comprises a sensor, and wherein monitoring the proximity detector using the module comprises:

receiving the signal from the sensor, wherein the signal includes data representing a distance value for the proximity;

determining that the distance value is equal to or less than a threshold; and in response to determining that the distance value is equal to or less than the threshold, causing the alarm to generate a first alarm as the indication.

15. The method of claim 14, wherein monitoring the proximity detector using the module further comprises determining that the distance value has decreased from the threshold and, in response, causing the alarm to generate a second alarm that is different from the first alarm as the indication.

16. The method of claim 10, wherein the indication generated by the alarm comprises a visual indication, an audible indication, a vibratory indication, or a combination thereof.

17. The method of claim 10, wherein the proximity detector comprises a sensor, and wherein monitoring the sensor using the module further comprises:

determining that a velocity of the catwalk machine, the tubular, or both exceeds a threshold; and causing the alarm to generate the indication based on a combination of the velocity and the proximity.

* * * * *